United States Patent

Duck et al.

Patent Number: 5,920,411
Date of Patent: Jul. 6, 1999

[54] OPTICAL MULTIPLEXING/ DEMULTIPLEXING DEVICE

[76] Inventors: Gary S. Duck, 6 Barcham Crescent, Nepean, Ontario, Canada, K2J 3Z7; Yihao Cheng, 36 Meadowbreeze Drive, Kanata, Ontario, Canada, K2M 2L6

[21] Appl. No.: 08/801,118

[22] Filed: Feb. 14, 1997

[51] Int. Cl.[6] ............................................. H04J 14/02
[52] U.S. Cl. ............................................ 359/127; 359/161
[58] Field of Search .......................... 359/127–131, 359/161

[56] References Cited

U.S. PATENT DOCUMENTS

| | | | |
|---|---|---|---|
| 4,244,045 | 1/1981 | Nosu et al. | 370/3 |
| 4,707,064 | 11/1987 | Dobrowolski et al. | 350/96.19 |
| 4,756,587 | 7/1988 | Sano et al. | 359/127 |
| 5,113,277 | 5/1992 | Ozawa et al. | 359/127 |
| 5,457,558 | 10/1995 | Yokoyama | 359/127 |
| 5,521,733 | 5/1996 | Akiyama et al. | 359/127 |
| 5,583,683 | 12/1996 | Scobey | 359/127 |

*Primary Examiner*—Leslie Pascal
*Attorney, Agent, or Firm*—Neil Teitelbaum & Associates

[57] ABSTRACT

An optical multiplexing/demultiplexing device has a plurality of optical ports along a cascading optical path with wavelength-specific filters disposed at the ports. The filters are selected to form groups of at least two virtually identical filters. At least one "add" connection is provided for admitting a selected band into the optical path, the connection being disposed at a second or consecutive (third, fourth etc . . . ) filter of the same wavelength as the band being added. The device uses a single medium for processing optical signals, e.g. a single polygonal optical block or air.

17 Claims, 3 Drawing Sheets

OPTICAL MULTIPLEXING/ DEMULTIPLEXING DEVICE

FIELD OF THE INVENTION

This invention is directed to an optical device for dividing, or filtering, a multi-wavelength optical signal into a plurality of defined bands, or channels, bands being directed to a separate waveguide output line, with the possibility of adding selected optical signals to the original signal bandwidth in the "add-and-drop" mode; the device may also be used in a reverse fashion, for multiplexing a plurality of different channels into a single signal.

BACKGROUND OF THE INVENTION

Systems employing optical wavelength division multiplexing (WDM) and demultiplexing (WDDM) are widely employed. A bandwidth, or bundle, of different wavelength sub-ranges, defined as bands or channels, can be carried over a common optical fiber waveguide and separated into multiple channels, each carrying a predetermined wavelength range. Conversely, it is possible to reverse the process and to combine, or multiplex, two or more separate channels into a common output signal.

In a WDM system, it is often advantageous to add an extra band or remove a band to an optical signal; this approach is known in the industry as an "add or drop" respectively.

In a demultiplexing mode of operation, it is desirable to isolate a predetermined band from the remaining wavelength bundle rather than leave a portion of the respective wavelength sub-range with the bundle which may cause transmission noise later on. A well-isolated wavelength band, or sub-range can be represented graphically as an (ideally) rectangular shape on the intensity/wavelength graph. The band should ideally be separated from an adjacent, usually closely spaced, band or wavelength range and free of "fringe" wavelengths, i.e. signals extending beyond the predetermined wavelength sub-range. One of the problems occurring in WDM systems is unsatisfactory isolation of separate channels filtered out (demultiplexed) from the original bandwidth signal. In the known wavelength-selective optical filters known to date, the filtering of a predetermined band (sub-range) through an optical interference filter is inherently much less than complete. While the efficiency is quite substantial, an unfiltered part of the sub-range remains with the other bands and constitutes an undesirable noise. It is certainly desirable to improve the efficiency of removal of a specific band before the remaining signal is directed to the filter corresponding to a next wavelength sub-range or channel.

Known in the art are systems wherein an input signal is passed from a waveguide through a collimating means (e.g. GRIN lens) onto a first wavelength-selective filter, a predetermined band having a first wavelength sub-range is filtered transmitted through the filter, and the remaining signal, reflected from the first filter, is returned through the GRIN lens and another waveguide to a second filter of the same wavelength range as the first filter. While this system offers multiple filtering and is effective in removing (isolating) a substantial part of the first sub-range from the input signal, the associated transmission losses incurred by the multiple passage through lenses and waveguides are significant.

U.S. Pat. No. 4,244,045 to Nosu et al. discloses a multiplexing/demultiplexing system. The system has a plurality of optical filters each of which transmits a predetermined wavelength and reflects other wavelengths. The filters are arranged such that an optical beam is transmitted or reflected via each optical filter in sequence in a zigzag fashion. A light source or light detector is provided behind each optical filter to project or receive a collimated optical beam. Another optical means is provided to connect the multiplexer/demultiplexer with an outside optical filter, wherein the transmission wavelength of each optical filter is different from the others.

U.S. Pat. No. 4,777,064 to Dobrowolski et al. proposes an optical mixing/demixing device having a series of solid, light transmitting blocks, each having opposed, front and rear parallel planar faces coated with optical interference multilayer coatings constituting bandpass filters, and light transmitting faces arranged one on each side of the front planar face. The blocks are arranged side by side with a collimating lens on the first light transmitting face and further lenses on each of the second light transmitting faces. The multilayer interference coatings are such as to reflect light of a particular spectral sub-range and transmit the remaining wavelengths. When the device is used in the demixing (demultiplexing) mode, a light beam passes through at least one of the blocks wherein a particular spectral band of the beam will be reflected internally several times by the interference coating before exiting the block. The device can function in a multiplexing and demultiplexing mode.

U.S. Pat. No. 5,583,683 to Scobey describes a multiplexing device having an optical block with an input optical port to admit an input multiple wavelength collimated light signal, and a variable thickness interference filter forming arrayed ports along the surface of the optical block, the filter being transparent at each of the ports to a different sub-range of the input signal and reflective to other wavelengths. The input light signal is cascaded along a multipoint travel path from one to another of the arrayed multiple ports.

In analyzing the system of the U.S. Pat. No. '683' Scobey patent, it has been realized that the system employs a sequence of filters each of which corresponds to a different distinctive wavelength band. While the system keeps the signal within the optical block and is effective in reducing transmission losses due to the passage of a signal through multiple lenses and waveguides, it has an inherent drawback in that each wavelength band exiting the optical block passes through only one wavelength-specific filter. The single pass is insufficient to isolate a selected wavelength from the remaining multi-wavelength input signal with sufficiently high efficiency, and a significant amount of the band remains in the signal as a noise.

It is desirable, as explained above, to improve the efficiency of isolation of predetermined wavelength bands from the remaining signal, preferably without incurring excessive signal losses. As explained, transmission through a number of lenses and waveguides does incur such losses. On the other hand, forming a multiple filter by stacking filters of the same wavelength characteristics is likely to result in a marked loss of reliability.

SUMMARY OF THE INVENTION

It has been found that some of the above-discussed disadvantages may be alleviated by a device of the invention which comprises:

a structure having at least one optical port transparent to a multiple-wavelength optical signal and at least two further ports arranged in a spaced relationship to each other, the ports defining a cascading multi-point optical path, optical filters arranged at said at least two further optical ports, said filters transparent to a predetermined wavelength sub-range of said multiple-wavelength optical signal and reflective to other wavelength thereof, wherein the predetermined wavelength sub-range of at least two optical filters along said multi-point path is substantially the same.

In an embodiment of the invention, the device comprises a structure having at least one optical port transparent to a multiple-wavelength optical signal and at least two further ports arranged in a spaced relationship to each other, a first optical filter transparent to a predetermined wavelength sub-range of the multiple-wavelength optical signal and reflective to other wavelengths thereof, the first filter arranged at one of the at least two further ports, and a second optical filter transparent to the same or similar wavelength sub-range as the first optical signal and reflective to other wavelengths thereof, said second filter arranged at another of the further ports.

The structure may thus comprise a plurality of further ports and optical filters arranged at each of the ports, the optical characteristics of each filter being selected to form groups of at least two optical filters of same or similar wavelength characteristics, the filters arranged along the multi-point path. The groups may be arranged in series (consecutively) or non-consecutively.

The structure may be embodied by a glass block of various shapes, including for example, in cross-section, a parallelogram, a rectangle, a polygon (pentagon, hexagon etc.). Alternatively, the structure may be embodied by a support means carrying the array of sequential filters so disposed as to define the multi-point optical path, the path extending through air, another gas or vacuum.

The device may further comprise means for adding another input optical signal of a predetermined wavelength sub-range to the signal being passed through the device and including the same wavelength band. The means, according to the invention, are disposed at a second or subsequent optical filter transparent to substantially the same wavelength sub-range.

BRIEF DESCRIPTION OF THE DRAWINGS

The invention will be explained in more detail by the following description to be taken in conjunction with the drawings, in which.

DETAILED DESCRIPTION OF THE INVENTION

Figure 6:
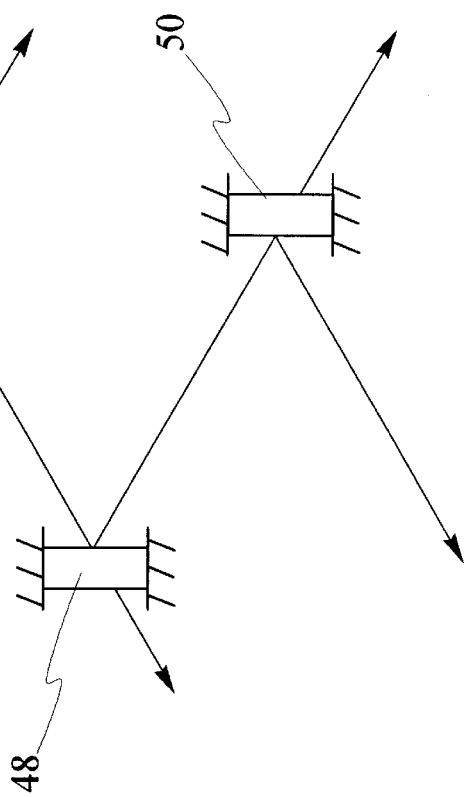
FIG. 6 is a schematic illustration of an embodiment of the device with an optical path extending through a gaseous atmosphere.

The term "structure", as used in the present specification, has a wide-ranging meaning. It may denote a glass block such as in FIGS. 1–5; or it may denote any structure supporting a properly arranged array of optical filters with an empty space (typically filled with air) therebetween along the multi-point path of the optical signals (FIG. 6). The term "sequential" has the same meaning as "cascading" in the U.S. Pat. No. '683' Scobey patent and is explained in the following description with reference to the drawings.

As shown in FIGS. 1–4, the multiplexing/demultiplexing device of the invention has a glass block 10 of a rectangular shape in cross-section, or plan view. A collimating lens 12 couples a multiple-wavelength input optical beam 14 to the block 10 at an angle through an input port 18. The beam passes through the block 10 to an output port 19 having an optical filter 20 which is selected to be transparent to a first wavelength band, $\lambda_1$, and reflect the remaining wavelength sub-ranges $\lambda_2$, $\lambda_3$, $\lambda_4$ etc. designated hereafter as 22. As explained hereinabove, most but not all of the first wavelength band $\lambda_1$ is removed at the filter 20, and the signal reflected from the filter 20 still contains a few percent of the first wavelength band. The reflected signal 22 in turn passes to a second filter 24 associated with an output port 26. The second filter 24, importantly, is selected to be transparent to an identical, or substantially identical, wavelength sub-range as filter 20. At least a substantial part of the band $\lambda_1$ still remaining in the signal 22 is therefore removed at the port 26 (designated in FIGS. 1–5 as $\lambda_1$'). Since the intensity of the band removed at the second filter 24 is much lower than that of the main $\lambda_1$ band removed at the filter 20, the $\lambda_1$' band can either be disregarded or used as a tap to monitor the performance of the main band $\lambda_1$ which is removed at port 19.

The signal 27 leaving the block contains the remaining wavelengths and is practically free of the first wavelength band $\lambda_1$. The ports 19 and 26 are "sequential ports" in the meaning of this specification.

Figure 1:
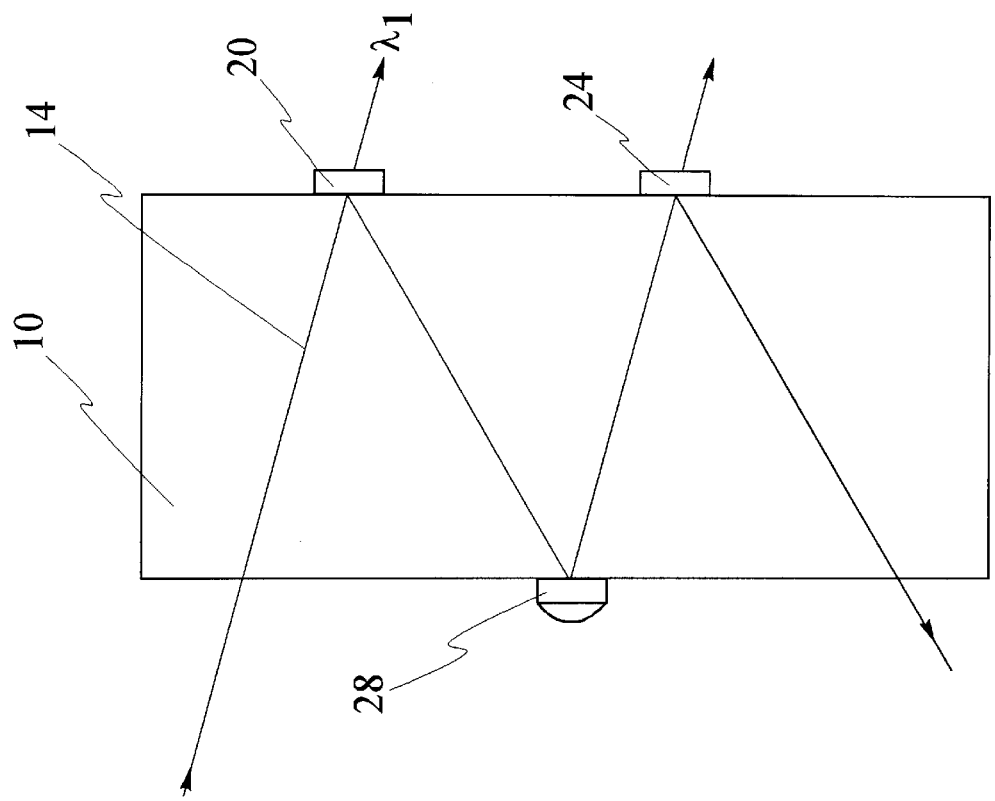
FIG. 1 is a schematic illustration of a first embodiment of the multiplexing/demultiplexing device of the invention, specifically for isolating a single optical channel.

While only two output ports are shown in FIG. 1, it is clear that the device may have a greater number of output ports.

The collimating lens 12 is not shown in the remaining figures, and some references are omitted for more clarity.

Figure 2:
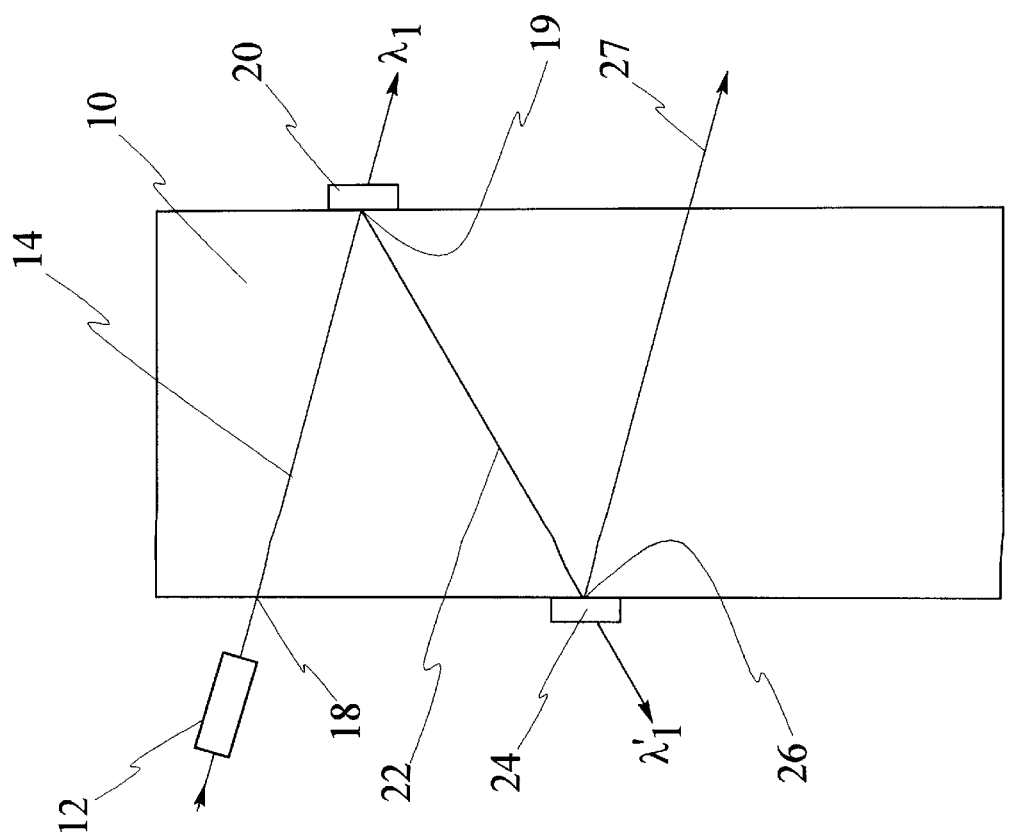
FIG. 2 is a schematic illustration of another embodiment of the invention wherein two optical filters are disposed on the same side of an optical block.
Figure 4:
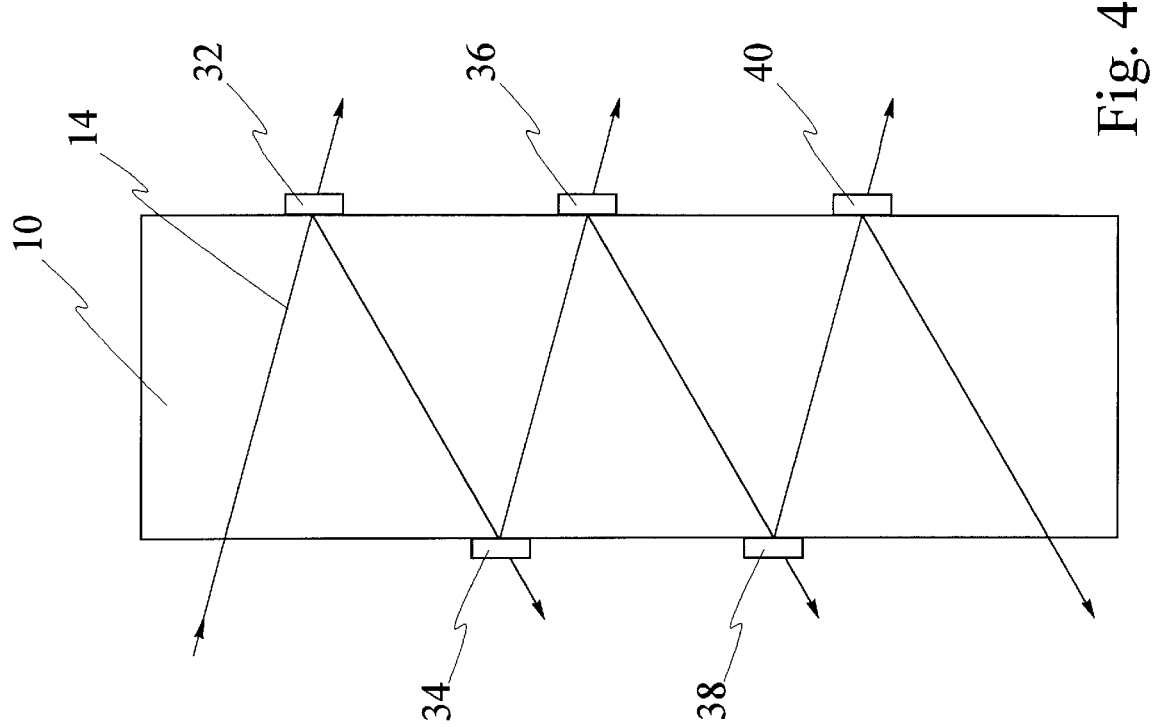
FIG. 4 is a schematic illustration of another alternative embodiment of the device, specifically a device for isolating two separate wavelength bands.
Figure 3:
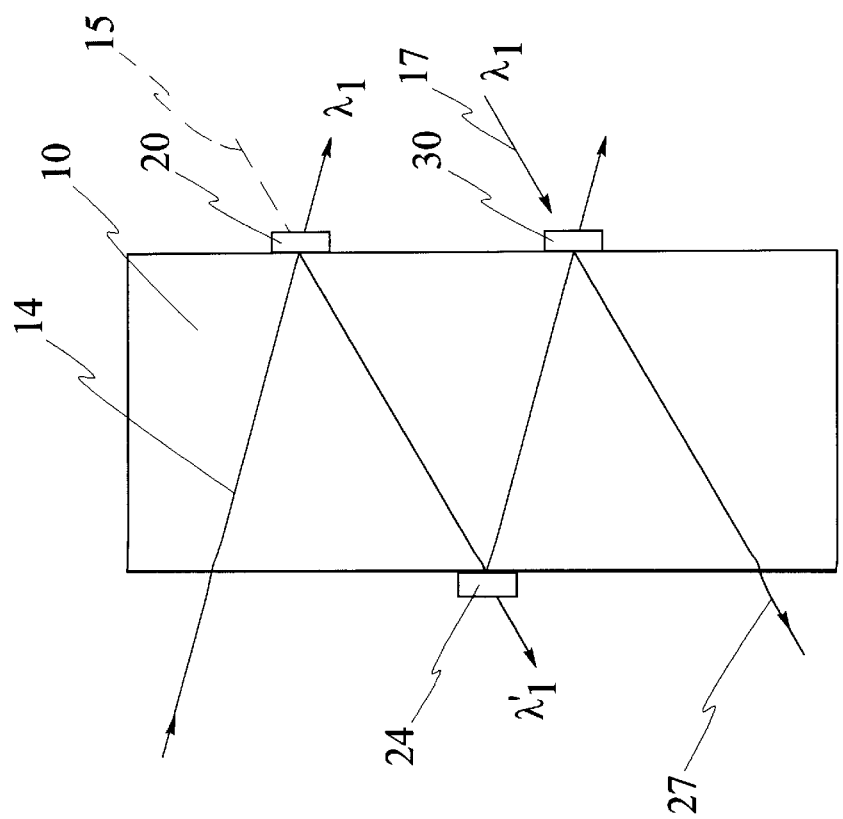
FIG. 3 is a schematic illustration of an alternative embodiment of the device employing an add-and-drop function.

The definition "sequential ports" does not exclude the use of intermediate signal-directing means in the multi-point path. Similarly as shown in FIGS. 2, 3 or 4 of the Scobey U.S. Pat. No. '683 patent, the specification of which is incorporated herewith by reference, mirrors or any light reflecting means may form part of the structure to guide the input signal or signals along the multi-point path between the ports and associated filters. Such an embodiment is illustrated in FIG. 2, where a reflector 28 is situated in the path of the signal 14, which allows the filters 20, 24 to be situated on the same side of the optical block 10.

FIG. 3 illustrates one of the advantages of the invention i.e. its add-and-drop functionality. It will be recognized that it is not feasible to add a "new" channel using a wavelength $\lambda_1$ (shown hypothetically as a dashed line and designated as 15) through the first filter 20 which removes another signal of the same wavelength from the input broadband signal 14 because of imminent cross-talk at the filter 20. Instead, such "new" $\lambda_1$ channel 17 is introduced into the device and added to the current signal through the third $\lambda_1$ filter 30 which has the same optical characteristics as the preceding filters 20, 24.

The cross-talk between the signal 17 entering through the filter 30 and the signal $\lambda_1$' which is transmitted through the filter 24 is virtually non-consequential as the signal $\lambda_1$' can be disregarded.

In the absence of the "new" signal 17, will be a triple filtering of the wavelength $\lambda_1$ from the initial multiple-wavelength signal 14.

As seen in FIG. 4, the input signal 14 passes sequentially to filters 32, 34, 36, 38 and 40. Filters 32, 34 and 36 may be selected to be transparent to a first wavelength sub-range; filters 38 and 40 may be transparent to another sub-range; as a result, the first wavelength will be triple-filtered from signal 14, and the other wavelength band will undergo double filtering. Of course, if desired, any number of "repeat" filters (e.g. 32, 34, 36) may be employed, resulting in a substantially better isolation of the respective band from the remaining signal.

Alternatively, the two or more filters transparent to a first wavelength sub-range may be non-sequential, i.e. separated by a filter or filters of a different wavelength characteristics. In the embodiment of FIG. 4, the filter 32 and 36 may be transparent to a first wavelength sub-range; filters 34, 38 and 40 may be transparent to a second, different wavelength sub-range. In operation, most of the first wavelength sub-range would be dropped at the first filter 32; the remaining portion of the first sub-range would pass to the filter 34, reflect from that filter, and be transmitted to a substantial degree through the second filter 36 of the same wavelength characteristics as the filter 32. In other words, a band would still be filtered twice or more times as desired even if the filters of the respective wavelength characteristics were arranged non-consecutively.

The embodiment of FIG. 4 can operate in the add-and-drop mode. To that effect, another band can be added through a second or more distant of two or more filters having a similar wavelength characteristics. In the particular example of FIG. 4, let us assume that filters 32, 34 and 36 are transparent to wavelength band X and filters 38 and 40 are transparent to band Y (and reflective of other wavelengths. (As explained above, the groups of similar filters can also be non-consecutive). An additional signal of wavelength X can be added, according to the invention, through filter 34 or 36 (second or subsequent filter) by way of a conventional waveguide and collimating lens, not shown; and an additional signal of wavelength Y can be added through filter 40 (second of two filters transmitting wavelength Y).

Figure 5:
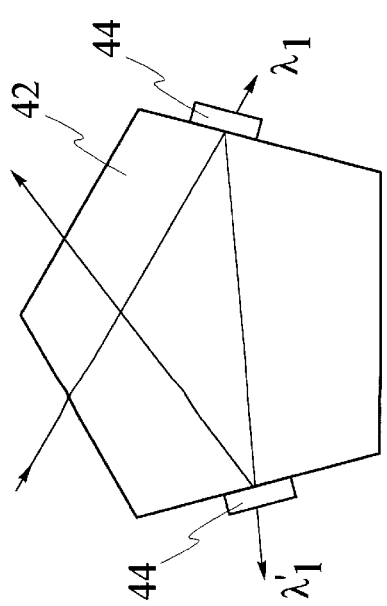
FIG. 5 is a schematic illustration of yet another embodiment of the device employing a pentagon-shaped optical block.

FIG. 5, showing a pentagonal optical block 42 with two identical filters 44 for transmitting wavelengths $\lambda_1$ and $\lambda_1'$ is an example of various possibilities of the shapes of optical blocks suitable for the purpose of the invention. The shape may be almost any polygon (in cross-section) or a polyhedron as long as the optical signal may be passed along a multi-point path between the input and output ports.

FIG. 6 visualizes the above-described embodiment of the invention where no solid optical block is used for the transmission of the signal between the filters of the device; instead, suitable supports are employed for the sequential filters 46, 48 and 50 defining respective output ports.

It will be noted that in all the preferable embodiments of the invention, the signal passes between the ports in a single medium, e.g. through a single uninterrupted glass block or through air (the filters are not taken into consideration). This is in contrast to some prior art systems where the multiple filtering is accomplished while the signal passes through a plurality of media (waveguides, lenses etc.).

It will be understood that the embodiments illustrated and described herein are exemplary only. The drawings are not necessarily to scale either in the dimensional or angular relationships.

It is an advantage of the device of the invention that it enables multiplexing of a multiple-wavelength optical signal with an improved isolation of predetermined wavelength bands from the remaining wavelengths of the signal.

It is a further advantage of the invention that it can perform the add-and-drop function with substantially reduced cross-talk between bands of different wavelengths. This advantage stems from the main feature of the invention i.e. the provision of two similar consecutive or non-consecutive filters in the optical path of the multiplexing/demultiplexing device While only the demultiplexing function and the add-and-drop function have been described herein in detail, those skilled in the art will readily recognize that the device can be employed in a reverse fashion to multiplex optical bands the possibility of reversing the demultiplexing function into a multiplexing function; in the latter, separate bands can be transmitted through the sequential ports and multiplexed into a multiple-wavelength optical signal.

What is claimed is:

1. A multiplexing/demultiplexing optical device which comprises:

a structure having at least an input port transparent to and disposed to receive a multiple-wavelength optical signal and at least three further sequential ports arranged in a spaced relationship to each other, said at least input port and said at least three further ports defining a serial, cascaded, unguided, multi-point optical path, multi-layer interference optical filters arranged serially at said at least three further sequential ports along said unguided optical path, at least two of said multi-layer interference filters for at least twice filtering a predetermined wavelength of the multiple-wavelength optical signal prior to allowing a remaining portion of said multiple-wavelength optical signal to continue along the unguided multi-point optical path to another of said multi-layer interference filters for filtering another predetermined wavelength of the multiple-wavelength optical signal.

2. The device according to claim 1, wherein at least two ports are substantially transparent to multiple wavelengths of light.

3. The device of claim 1 wherein at least a third filter of the at least three filters is for filtering a second wavelength other than the predetermined wavelength after the predetermined wavelength has been twice filtered.

4. The device of claim 3 wherein said groups are formed of consecutive filters.

5. The device of claim 3 wherein such groups are formed of non-consecutive filters.

6. The device according to claim 1 wherein said structure is a polygonal optical block.

7. The device according to claim 1 further comprising means for directing a signal having the predetermined wavelength range into said multi-point optical path through an at least second of said at least two optical filters having substantially the same wavelength sub-range.

8. The device according to claim 7 wherein the multi-point optical path extends through a single medium.

9. The device according to claim 1 wherein the multi-point optical path extends substantially through a single medium.

10. A multiplexing/demultiplexing optical device comprising:

a structure comprising an input port and at least two output ports being arranged along an unguided multipoint optical path for at least partially demultiplexing a multiple-wavelength optical signal;

at least two optical filters, each disposed at one of the at least two output ports, each of the at least two filters having a same output response, in tandem, the at least two filters for twice filtering a first signal of the multiple-wavelength optical signal having a predetermined centre wavelength, a first of the at least two filters disposed to filter the first signal and provide it to its respective output port, a second of the at least two filters disposed to filter a remaining portion of the first signal and to provide it to its respective output port.

11. The device according to claim 10 further comprising means for directing a signal having the predetermined wavelength range into said multi-point optical path through an at least second of said at least two optical filters having substantially the same wavelength sub-range.

12. The device according to claim 11 wherein the multi-point optical path extends through a single medium.

13. The device according to claim 12, wherein at least two ports are substantially transparent to multiple wavelengths of light.

14. The device according to claim 10, wherein at least two ports are substantially transparent to multiple wavelengths of light.

15. A multiplexing/demultiplexing device comprising:

a structure comprising an input port;

the structure comprising at least a first port disposed to receive an optical signal from the input port and at least a first multi-layer interference optical filter at the first port, said first multi-layer interference optical filter disposed at said first port for filtering and passing out of the first port a first channel having a first center wavelength of light of a multiple-wavelength multiple channel optical signal, the first multi-layer interference optical filter being transparent to the first center wavelength of light of the multiple-wavelength optical signal and reflective to at least another wavelength of light corresponding to another channel thereof;

the structure comprising at least a second port and at least a second multi-layer interference optical filter having same optical filtering characteristics as the first filter, said second multi-layer interference optical filter disposed at said second port for filtering and passing out of the second port the substantially same first wavelength of light of the multiple-wavelength optical signal which was not sufficiently filtered by the first multi-layer interference optical filter and was reflected with a remaining portion of the multiple-wavelength optical signal, the second multi-layer interference optical filter being transparent to the substantially same first wavelength of light of the multiple-wavelength optical signal and reflective to at least another wavelength thereof, said second port and said second multi-layer interference optical filter being disposed in a sequential manner so as to receive the remaining portion of the multiple wavelength optical signal that is sequentially transmitted from the input port to the first port, from the first port to the first multi-layer interference optical filter, from the first multi-layer interference optical filter to the second port and from the second port to the second multi-layer interference optical filter.

16. A multiplexing/demultiplexing device as defined in claim 15 having an add-port for adding a signal of at least a new first wavelength to the multiple-wavelength optical signal, the add-port being adjacent a multi-layer interference optical filter, the multi-layer interference optical filter having a transmission/reflection output response substantially identical to the first multi-layer interference optical filter.

17. A multiplexing/demultiplexing device as defined in claim 16 wherein the add-port comprises a third port for adding the new first wavelength to the multiple-wavelength optical signal, the third port having a third multi-layer interference optical filter disposed thereon, the third multi-layer interference optical filter being transparent to the substantially same first wavelength of the multiple-wavelength optical signal and reflective to at least another wavelength thereof, said third optical port being arranged in a sequential manner so as to receive the remaining portion of the multiple wavelength optical signal that is sequentially transmitted from the input port to the first port to the first multi-layer interference optical filter to the second port to the second multi-layer interference optical filter to the third port to the third multi-layer interference optical filter.

* * * * *